Jan. 19, 1960 T. B. MARTIN 2,921,519
WELL SHOOTING
Filed May 15, 1952 5 Sheets-Sheet 2
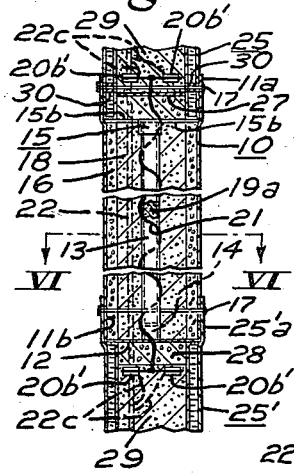
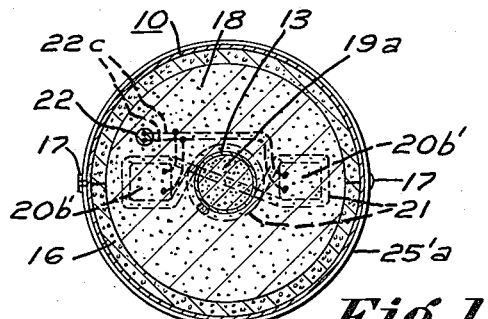
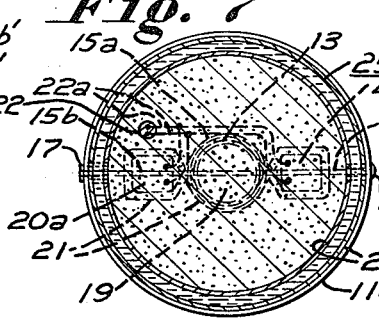
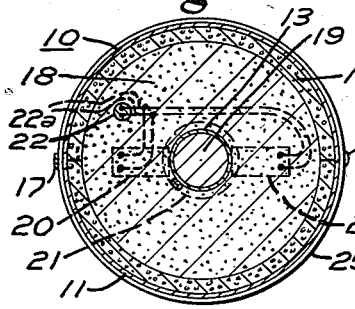
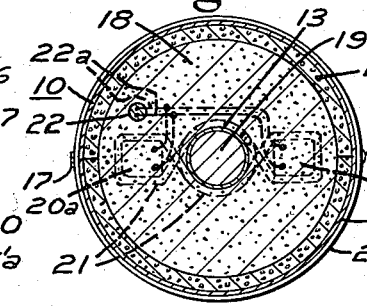
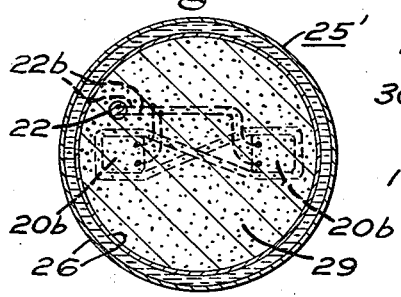
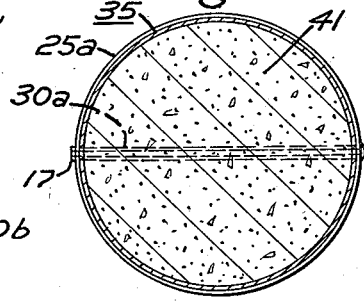
INVENTOR
Thomas B. Martin
by:
Green, McCallister & Miller
his Attorneys Jan. 19, 1960     T. B. MARTIN     2,921,519
WELL SHOOTING
Filed May 15, 1952     5 Sheets-Sheet 3
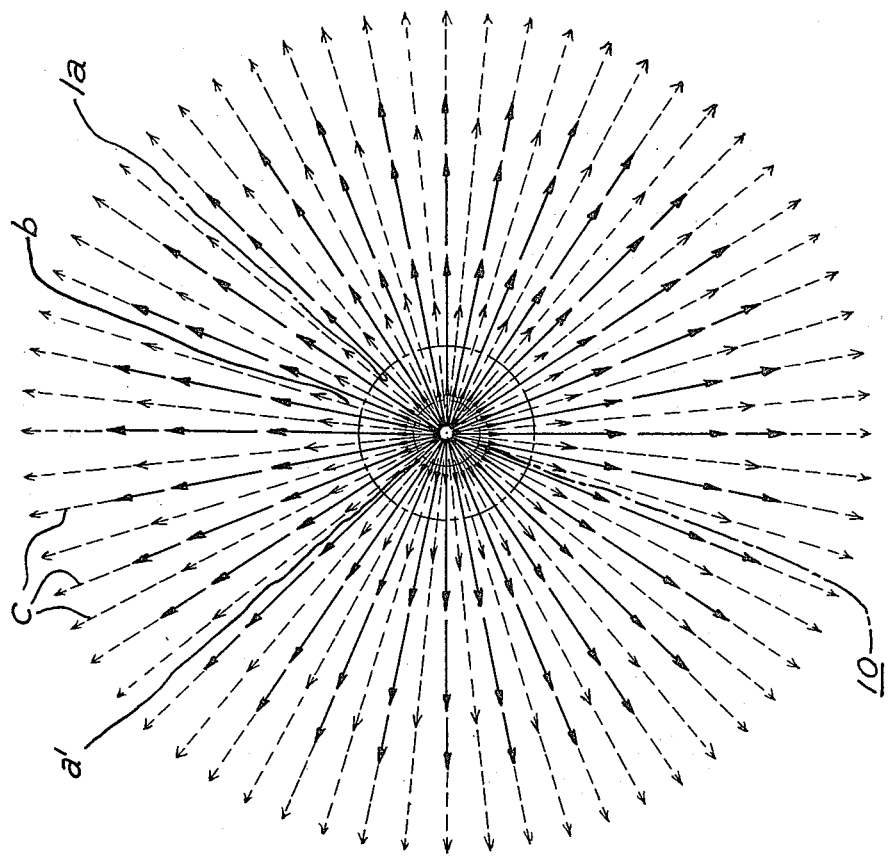
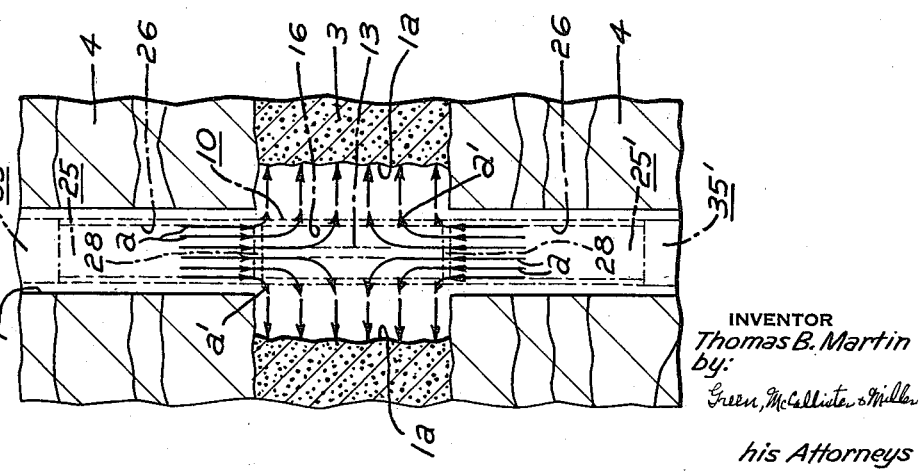
INVENTOR
*Thomas B. Martin*
by:
*Green, McCallister & Miller*
*his Attorneys*

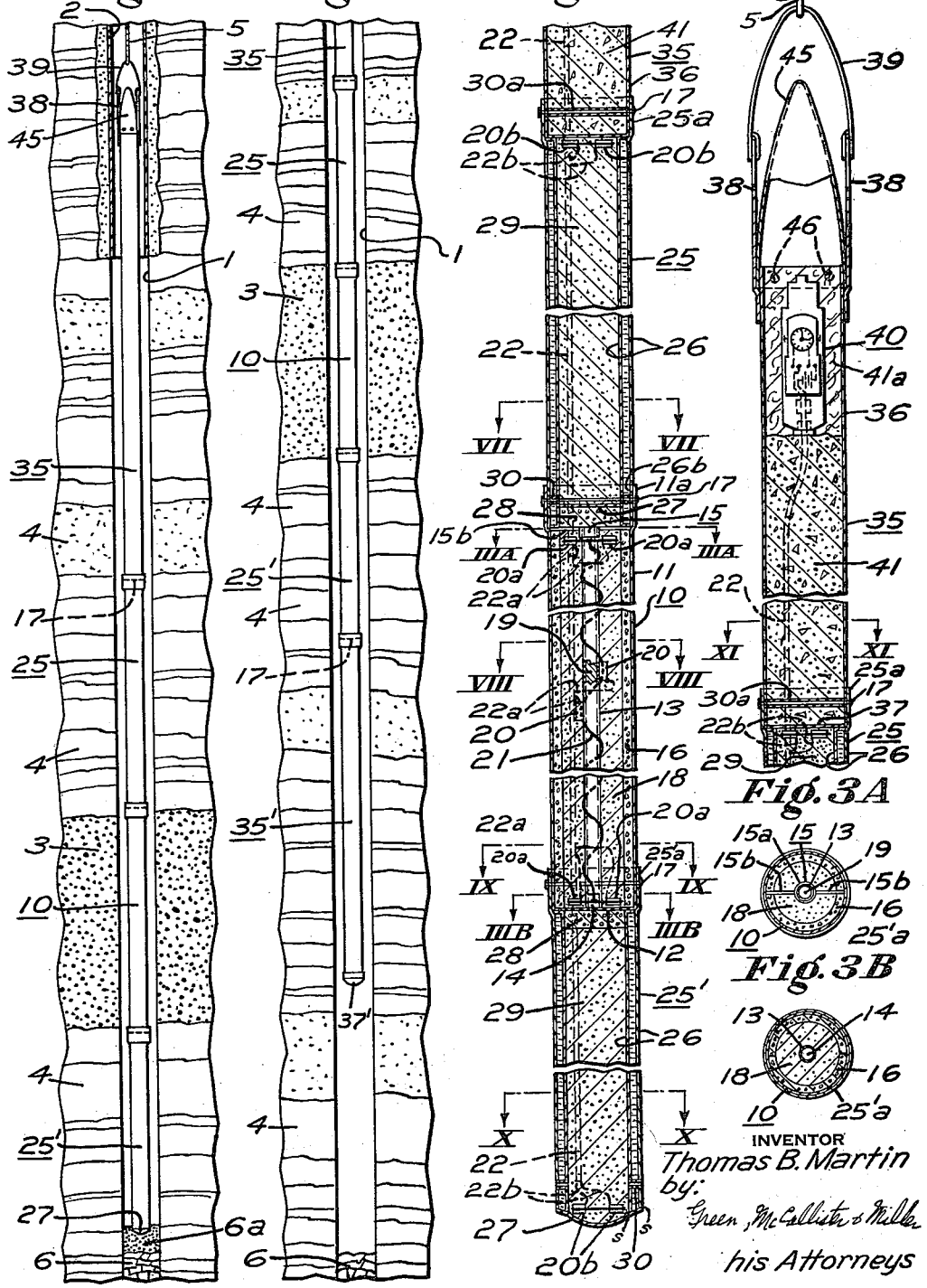

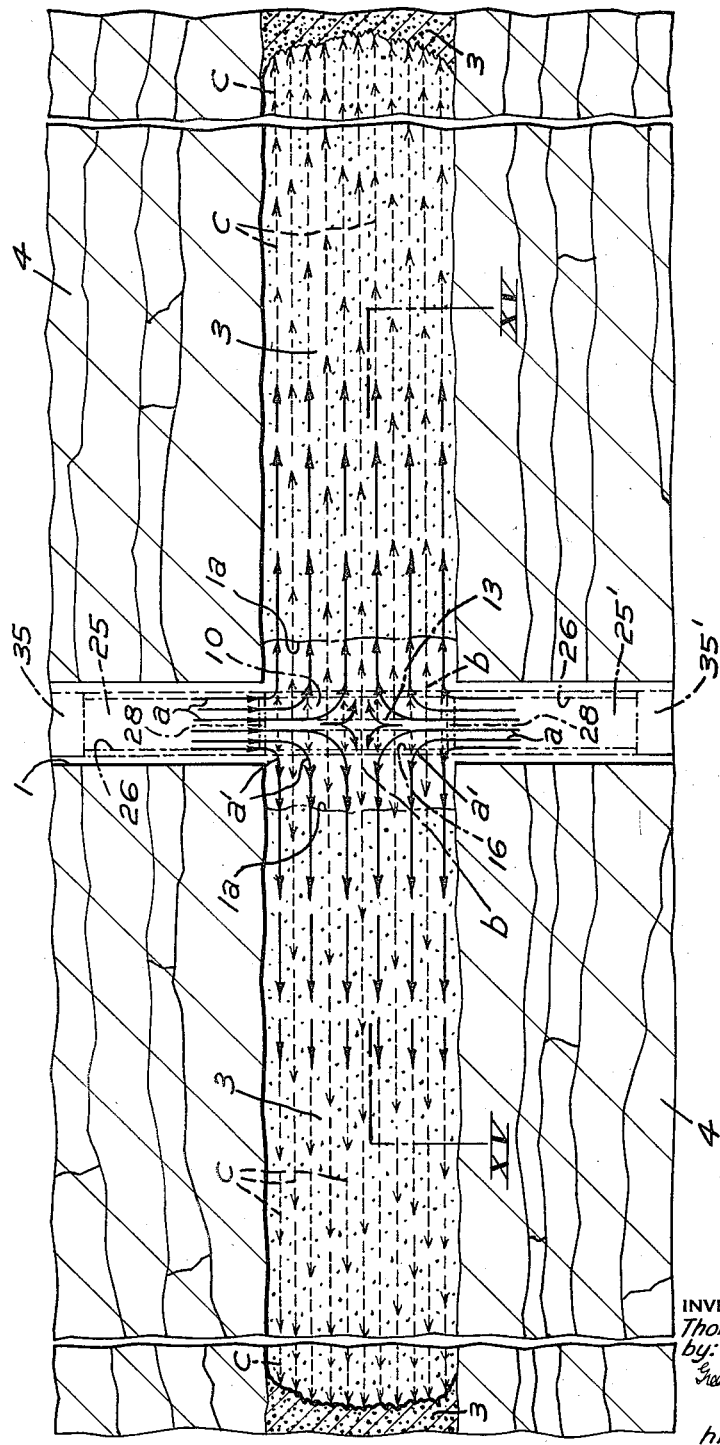

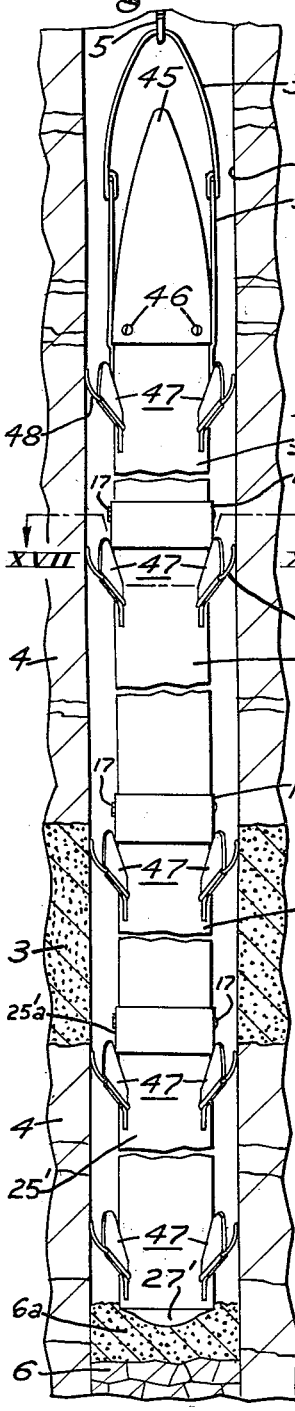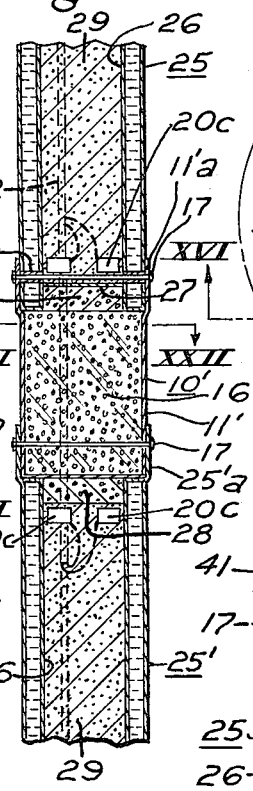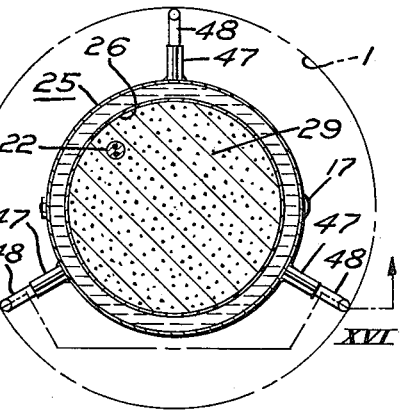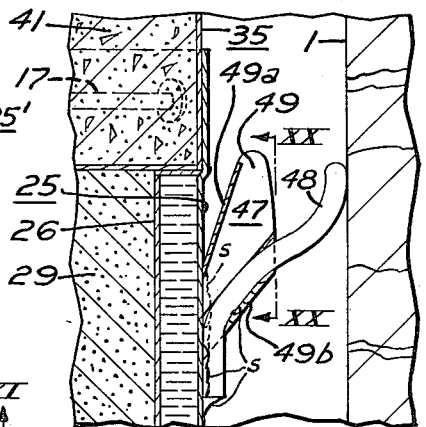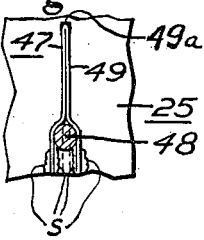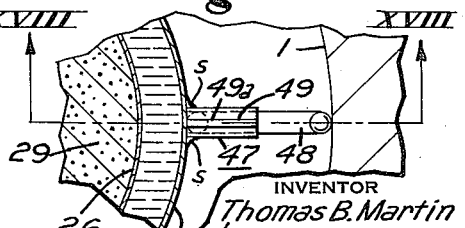

United States Patent Office 2,921,519
Patented Jan. 19, 1960

2,921,519
WELL SHOOTING
Thomas B. Martin, Bradford, Pa.

Application May 15, 1952, Serial No. 287,929

7 Claims. (Cl. 102—21.4)

This invention relates to shooting wells such as gas and oil wells to initiate or augment fluid flow from productive stratum and particularly, to making the explosive force action more effective and extensive in its scope.

In my copending application No. 183,066, filed September 2, 1950, and now abandoned, entitled Well Shooting Unit Utilizing a Porous Enclosing Body, of which this application is a continuation-in-part, I have disclosed what I believe to be a new principle which involves the utilization of a directionating, air-space-providing body of refractory particle construction. The body is employed in such a manner as to provide a very effective permeability-increasing effect where an explosive unit is employed in alignment with the productive stratum. In this arrangement, the penetration of the explosive force is, however, limited by the maximum efficiency that can be imparted to a unit charge.

In my further work in this field, I have found that the more uniform the force action about the shooting unit and the greater its distance penetration, the better are the possibilities of opening up a productive flow and of a greater quantity or pressure of flow. In considering the matter of still further distance penetration, I have recognized that the diameter of the well hole is a limiting factor as to the amount of explosive that can be effectively employed and that the force action should be concentrated along the width or depth of the productive stratum. At first, it appeared that a beneficial result could be accomplished by employing a second shot, but aside from the additional expense and the difficulty of cleaning out the well hole after each shot, I determined that little, if any, further distance penetration was accomplished along the productive stratum.

After further work in this connection and a full evaluation of the factors involved, I arrived at the conclusion that the energy of subsequent shots was absorbed to too great an extent in duplicating or retracing the work of a previous shot. I then set out to discover how the energy of an additional shot could be more effectively utilized to extend distance penetration and in a more additive manner.

It has thus been an object of my present invention to solve the problem above discussed and to provide a greatly increased and more effective distance penetration of permeability-increasing explosive action on a productive stratum.

Another object has been to devise an improved well shooting system, assembly or string.

A further object has been to work out improved shooting units employing the principles of my invention.

A still further object has been to devise a method of making an optimum utilization of shooting forces and of making them more effectively additive in their results.

These and many other objects of my invention will appear to those skilled in the art from the description thereof.

In arriving at a solution to the problem, I determined that any supplemental shots employed should, in effect, be continuous with the main shot, should follow the same directed path as the main shot, should be directed into the main shot in a controlled manner, should be effective with the main shot and should, as an optimum, be initiated before the main shot and be applied thereto in such a manner as to further the directionating action. I also found that the employment of supplemental charges requires a still greater exactitude of directionating effect as to the main charge, and that the supplemental shots also had to be directed towards and into the main shot and in such a manner as to avoid damage to supporting strata, etc. that are located above and below the path of the main charge.

In carrying out my invention, I discovered that the above and other factors could be met by positioning supplemental or booster charges above and below the main charge, by confining the force action of the booster charges longitudinally of the well hole, by directing the explosive action of the booster charges simultaneously into opposed or opposite sides of the main charge, by making the force of the booster charges of maximum effectiveness as applied to the main charge, by bending the forces produced by the booster charges into the path of the forces of the main charge while, at the same time, employing the forces of the booster charges to confine and direct the forces of the main charge, by timing the main and booster charges to make the most efficient use of them and to do so in such a manner as to avoid a duplication of resistance-overcoming effort and to make the forces progressively additive to produce a maximum distance penetration within the productive stratum. One important phase of my invention relates to the employment of opposed, axially or longitudinally directed, expanding explosive forces which are combined in a centrally-located compacted force band that is directed uniformly, radially or transversely outwardly with respect to the initial axial or longitudinal movement of the forces.

In the drawings, I have illustrated a practical application of my invention in which Figure 1 is a greatly reduced longitudinal section in elevation through a lower end of a well hole with an assembly or string of my invention in shooting position therein;

Figure 2 is a view similar to Figure 1, but illustrating an assembly for use where the well hole, itself, does not provide tamping for the lower end of the assembly;

Figure 3 is an enlarged vertical section through members or units of the assembly of Figure 1 showing details of their construction and connected relationship;

Figures 3A and 3B are horizontal or transverse sections taken respectively, along the lines IIIA—IIIA and IIIB—IIIB of Figure 3;

Figure 4 is a vertical section on the scale of Figure 3 showing details of the construction of an upper unit of the string or assembly of Figures 2 and 3;

Figure 5 is a section similar to Figure 4 showing details of a slightly modified main unit for the assembly of Figure 3;

Figure 6 is an enlarged horizontal or transverse section taken along the line VI—VI of Figure 5;

Figures 7 to 10, inclusive, are enlarged transverse sections along the lines VII—VII, VIII—VIII, IX—IX and X—X respectively, of Figure 3;

Figure 11 is an enlarged transverse section along the line XI—XI of Figure 4;

Figure 12 is a fragmental vertical section showing an assembly of the type of Figure 2 that has a bottom tamping unit;

Figure 13 is an enlarged fragmental vertical sectional diagram showing initial hole enlargement;

Figure 14 is an enlarged vertical sectional diagram showing final explosive force action;

And, Figure 15 is a somewhat graphic plan view taken on line XV—XV of Figure 14 and showing radial lines of force.

Figure 16 is an enlarged longitudinal view in elevation through a lower end of a well hole with an assembly or string of my invention in shooting position therein; this view illustrates guide and alignment fins appled to the units of my shooting assembly and is taken along the line XVI—XVI of Figure 17;

Figure 17 is a further enlarged horizontal section taken along the line XVII—XVII of Figure 16;

Figure 18 is a greatly enlarged vertical fragmental sectional detail illustrating the construction of the fins of Figure 16 and taken along the line XVIII—XVIII of Figure 19;

Figure 19 is a horizontal section of and on the same scale as the fin construction of Figure 18;

Figure 20 is a vertical end section on the scale of and taken along the line XX—XX of Figure 18;

Figure 21 is a substantially full scale fragmental vertical section in elevation taken along the line XXI—XXI of Figure 22 and showing a modified shooting string or assembly made in accordance with my invention and which may be employed for bursting a pipe collar, for example; and, Figure 22 is a horizontal section taken along the line XXII—XXII of Figure 21.

In accordance with the principles of my invention, I employ a string made up of a main explosive unit in substantial alignment with a productive type of sand, an upper and a lower booster or supplementary explosive unit in an endwise abutting relationship with the main unit, and at least one end tamping or buffer unit. The main unit is provided with a directionating core therealong, with a directionating air space about the explosive material therein, and with detonator means for its main body of explosive material that is timed to follow the explosion of the supplementary or booster units. It should be noted in this connection that an air space to be effective to produce a directionating effect should be of minimized density in the sense that it has a lesser density than the explosive and a greatly lessened density with respect to solid materials such as employed in providing the directionating core and containers for the explosive units. In this connection, it is contemplated that the air space may have the same pressure as the surrounding atmosphere. It will also be noted that main and booster explosive units of my construction are employed in endwise abutment and alignment and that explosive forces generated by the booster units are positively directed into the main unit within the vertical confines of main and booster units.

Each booster unit contains explosive material encircled or enclosed by a tamping jacket and has an air space directionating element at its inner end that abuts an opposed end of the main unit. A top tamping unit containing a solid mass material, such as concrete or cast iron, carries a bail for suspending the string or assembly in the well hole, and may serve to position a clock timer for the explosive material or changes of the units. A bottom tamping unit is used where the bottom of the well hole or other natural tamping means cannot be used.

Referring particularly to Figures 1 and 2 of the drawings, I have shown a well hole 1, the lower end of a casing 2 therein, and an assembly or string which is constructed in accordance with my invention and is suspended by a cable 5 within the well hole 1, so that its main unit or charge 10 is located beneath the end of the casing 2 and in lateral or transverse alignment with a productive sand or stratum 3. In this view, I have shown the string resting at its lower end 27 upon sand 6a of a bottom 6 of the well hole. As a result, the bottom of the well hole serves as a tamping end for a lower supplementary or booster charge unit 25' which charge unit 25 to provide a substantially continuous explosive force action with the main unit 10. It will be noted that the booster units may be positioned along rock or non-productive stratum 4 and in accordance with my invention are employed without damage to such stratum or structure. The upper supplementary or booster unit 25 is provided with a tamping unit 35 having a bail to which the cable 5 is attached and which may carry a timing mechanism for exploding the charges or shots of the system, assembly, or string. As shown, the upper tamping unit 35 may extend through a lower end portion of the casing 2 and the positioning and construction of the string is such that no damage is done to the casing by the shooting operation.

In Figure 2, I have shown a slightly modified form which is the same as Figure 1, except that its bottom booster unit 25' is provided with a tamping unit 35' to take the place of the bottom 6 of the well hole. This permits the string to be used at a higher level within the well hole. It is thus apparent from a study of Figures 1 and 2 that a string of my invention may be employed for shooting any desired productive stratum, but that its main unit 10 should, as an optimum, be positioned beneath or clear of the end of the casing 2 to prevent damage to it. This is practical, since it is customary to extend the casing to a position above the productive stratum or prospective productive stratum from which productive flow is to be utilized. But, in any event, the casing 2 may be raised above the stratum 3 that is to be shot. In many cases, a shooting operation may be employed to increase the flow of an old or substantially exhausted well to again make it productive. In other cases, it may be used, after a new well hole has been drilled, to either increase the flow of productive gas or oil or to initiate such a flow.

Referring particularly to the diagrammatic showing of Figures 13, 14 and 15, my invention involves the utilization of highly effective, directed, explosive forces generated by a main or central explosive unit 10 in a substantially and uniform annular path of increasing radius outwardly from the explosive unit. Supplementary or booster explosive units 25 and 25' which are positioned above and below the main unit 10 in longitudinal or endwise alignment with respect to each other and in an opposed endwise alignment with the main unit 10 are initially exploded (about a fraction of a second, e.g. $\frac{1}{1000}$ of a second) ahead of the main unit 10. The booster units are provided with highly effective directionating means, such that the explosive forces set up by each of them is directed towards the main unit and is not lost by deflection in an opposite-longitudinal direction or in a transverse or laterally-outward direction. Such supplementary explosive forces are also greatly enhanced by the employment of air-space directionating means and are timed to strike or hit the opposite or opposed sides of the main unit 10 at the same time and immediately before the main unit is, itself, exploded or detonated. In fact, the supplementary or booster shots may, in themselves, be employed to detonate the main or central charge of unit 10.

The units are employed in such a manner that the initial blast effected transversely-outwardly into the productive stratum 3 will initially enlarge the face diameter of such stratum to a diameter, indicated as 1a in Figure 13. In this figure, 1 indicates the original face diameter of the productive stratum; if, for example it is six inches, it will be expanded to a face diameter of about twelve inches, as represented by the annular face 1a.

After the initial blast, the explosive forces are expanded in a penetrating manner into the productive stratum 3 for a very great distance therealong by the combined or additive effects of both the main shot and the booster shots, see Figures 14 and 15. As an optimum, the main shot of unit 10 will comprise a slower burning explosive than the booster or supplementary shots (of units 25 and 25'), but in any event, the manner in which I employ the booster or supplementary shots provides a period or time of stratum-penetrating force action that is much greater than that of the explosive material of the main shot if it were used alone. In addition, the booster units, as an optimum, are provided with faster burning explosive material than the main shot and in this connection, I have found that a ratio of speed of about 2 to 1 is highly satisfactory. In any event, in accordance with my invention, the booster shots, by reason of their timed relationship, will exhaust themselves at least slightly ahead of the main shot which has an after-timing and produce two volumes of explosive for one volume of central explosive. The use of explosive material of a different (higher) speed or velocity for the supplementary units, as compared to the main or central unit, furthers this result.

Since substantially all of the forces of the supplementary units are directed as above indicated, they may be positioned above and below the productive stratum 3 and have any desired length without danger of damage to the well hole 1 or its supporting strata 4, to provide an additive force action that is distinguished from that made possible by the employment of a single, aligned, main or central unit. This is a highly important advantage of my invention and overcomes prior limitations as to the amount of explosive and volume of explosion that can be effectively utilized to produce a good productive-stratum-penetrating result and without producing deleterious results, such as clogging the well hole and damaging its supporting strata.

In accordance with my present invention, resistance to explosive-gas borne, permeability-increasing, silica particles and to the gas, itself, is initially overcome as to the immediate face area, and the application of forces is continued in such a manner that they are additive in their effect, taking advantage of inertia or resistance overcome by the initial explosive force energy and avoiding a duplication of effort which is incident or inherent in the utilization of so-called spaced shots which have a time interval between them. As pointed out earlier, the utilization of spaced shots has been substantially given-up as totally impractical in the art in question, particularly as a result of their uneconomical results. Thus, in accordance with my invention, I provide a continuous and substantially uniform force action (after an initial build-up peak) which first builds up to an initial burst when the combined forces break into the open against the well bore 1. This causes the enlargement 1a. After such initial overcoming of resistance, the main unit appears to act as an accumulator to feed the forces at a slightly lower value substantially uniformly into and lengthwise along the stratum 3. That is, normal peaks of explosive forces are, in effect, ironed-out and a substantially uniform and relatively long-continued penetrating-force action is attained and exerted under mediate speed conditions until and beyond the period when the booster shots have expired. Further, the application of the booster or supplementary force action is such that, although the booster units are positioned in an opposed relationship, their forces follow a concentrated, transverse, flow path as a combined stream with each other and with the forces of the main shot. The forces of the supplementary shots are so applied that they aid in limiting the width or depth extent of the main forces to a transverse path which is in alignment with the productive stratum and which is prevented from overlapping such stratum into non-productive strata. Further, the compression of the forces within a narrow, bounded area provides a time-continuity of substantially uniform, outward, force flow in an annular, radially-outward directed band that has never heretofore been accomplished and which I find highly conducive to increasing the permeability of a productive stratum as well as increasing the distance penetration of such stratum.

After the initial blast which as above pointed out increases the face diameter of the well hole, the forces flow smoothly in a penetrating manner thereafter and continue for a time period which as previously intimated, is greater than the normal time period of the individual explosive materials used. I believe this is due to the compression of the gases in the central area in such a manner that the central unit acts as an accumulator to smoothly feed out the forces for a maximum distance of penetration and with a maximum permeability increasing effect for the full extent of such penetration. This employment of explosive forces may be compared to building-up a charge in an electrical storage battery and then, continuously for a long period of time utilizing such forces in a more effective manner. In this respect, the central unit has force retentive characteristics and gives a maximum of force utilization without losses incident to spaced shots, in addition to a high uniformity of force action about the full radius of the unit which has not heretofore been attained.

In providing the directionating effects of the units of my invention, I have shown a water-jacket around or surrounding the supplementary units 25 and 25', have utilized end tamping for such supplementary units, and employ at least one air-space-providing directionating slug 28 at the discharge end of each booster unit, between such unit and the main or central unit 10. I have also employed directionating spacer slugs or elements 28 positioned in the path of the desired direction of travel of the explosive forces within the longitudinal extent of the explosive material of the supplementary or booster units for further increasing the effectiveness of the booster or supplementary force action in a longitudinally-inward direction towards the main unit.

In Figures 13, 14 and 15, I have indicated by arrows a the initial explosive forces as directed from the supplementary units 25 and 25' into the main or central unit 10 and which bend and diverge transversely-outwardly, as indicated by arrows a', while at the same time converging with and confining the width extent of the explosive forces generated by the main or central unit 10 which latter are indicated by arrows b, see Figures 14 and 15. The ultimate additive forces which penetrate the stratum are indicated by arrows c.

With particular reference to Figures 1, 2, 3 and 12, I have shown a main or central unit 10 made up as a cylindrical container having side walls forming a casing or housing 11, and a bottom wall 12 fitting therewithin and secured, as by cementing or soldering it thereto. A central or axial tube member 13 is shown mounted at its lower end over a short length, sleeve-like mounting stud 14 which is integral with or is secured to extend upwardly from the bottom wall 12. The tube member 13 may be cemented or soldered at its lower end to the stud 14 to extend concentrically-upwardly along the inside of the casing or housing 11. To reinforce or support the upper end portion of the tube 13, I have also shown a mounting spindle 15 having a slide band portion 15a (see Figure 12) to receive the upper end portion of the tube 13 and a pair of wire-like, spoke portions 15b that extend radially-outwardly from the sleeve portion 15a and rest against or are secured at their outer ends to inner sides of the housing 11.

An air-space-providing directionating agency in the form of a foam-like refractory body or layer 16 is positioned about and along the inner periphery of the housing part 11. The nature of the body 16 has been described in my previously-mentioned copending application and as an optimum, is of integrally-connected and spaced-apart foam glass particle construction. The agency or layer 16 is shown made up of two self-supporting, semicircular halves or pieces which enable them to be slid downwardly into the housing 11 with their seam edges abutting the spoke portions 15b of the mounting spindle 15.

An upper end portion 11a of the housing 11 is shown expanded outwardly to provide a receiving mouth or socket for the lower end portion of an upper, supplementary or booster unit 25. A lower end portion 11b (see Figure 5) is adapted to be received by a similarly expanded socket or mouth 25′a of an upper end portion of the lower supplementary unit 25′ to rest therein upon its closed-off water jacket. Bolt and nut assemblies 17 are shown extending through the portions 11a and 11b and through like portions of the upper 25 and lower 25′ interfitting supplementary units to locate them in an aligned relationship and secure them together in a string or assembly. It is noted that the bolt and nut of each assembly 17 is substantially flush with the side walls of the units to avoid interference with the wall of the well hole when the assembly or string is inserted longitudinally therein. An assembly 17 also extends through a sleeve 30a, a lower end wall portion of the unit 35, and the socket portion 25a to secure units 25 and 35 together, see Figure 3.

The unit 10 is shown filled-up with explosive material 18 as a main body portion thereof which is surrounded by the directionating layer 16 and which, itself, surrounds the axial-central tube member 13. As disclosed in Figure 3, the inside of the tube member 13 is filled with a solid mass (tamping) material, such as concrete or cast iron 19. A pair of vertical detonators 20 are shown mounted on the member 13 at a mediate portion of its length, and a pair of horizontal detonators 20a are shown mounted in the explosive material 18 at each end of the unit 10. These detonators may be connected together by a primer cord 21 and to a main wiring cable 22 by wiring leads 22a. It will be noted that the cable 22 extends longitudinally along each of the units from a timer 40, see Figures 3 and 4.

In the modified constructions of Figures 5 and 12, I have eliminated the mediate detonators 20 and have utilized an explosive material 19a within the full length of the tube member 13 which will, as an optimum, be of a faster type than the explosive material 18 (may be of the same type used in the booster units 25 and 25′) and which will at least be detonated slightly ahead (e.g. 1/1000 of a second) of the main body of material 18. The solid mass core 19 of the embodiment of Figure 3 serves to direct the explosive forces of the material 18 transversely outwardly. In a like manner the explosive material 19a of the embodiments of Figures 5 and 12 functions in the same manner, but further augments the forces available for the shooting operation.

In Figure 3, I have shown detonators 20a positioned within and at each end of the main unit 10 and that are closely adjacent to the directionator slugs or elements 28. In Figure 5, I have shown an alternate position, as illustrated by detonators 20b′ wherein, they are located within and at the inner ends of each booster unit 25 and 25′ and are closely adjacent to the elements 28. In Figure 12, I have shown a combination using detonators 20b′ and 20a, see the upper end of unit 10; the detonators 20b′ have been omitted from the upper end of unit 25′ of Figure 12, but will be positioned as indicated in Figure 5.

Referring particularly to Figures 1, 2, 3, 8 and 10, I have provided two supplementary or booster units 25 and 25′ of substantially similar construction. Each of the booster units has a directionating element 28 within its inner end portion. In the case of the upper unit 25, the element 28 fits within an open bottom end portion to rest against its bottom closure wall 27 and above the mounting spindle 15 of the unit 10, while in the lower unit 25′, the element 28 fits within its upper open end portion 25′a to abut against the bottom wall 12 of the unit 10. The upper unit 25 has an expanded mouth or socket portion 25a at its upper end to fit or telescope over a lower end portion of a tamping unit 35.

Each unit 25 or 25′ has a cylindrical, longitudinally-extending shape as defined by water-jacketed side walls 26 and the bottom wall 27. The latter is secured in position as by cementing or soldering. It will be noted that the wall 27 of the lower unit 25′ is located fully at its bottom end, see Figure 3. The upper (inner) end portion of the lower unit 25′ is expanded outwardly to provide a mouth or socket 25′a to receive or fit over a lower end portion 11b of the unit 10. The elements or slugs 28, as well as the layer 16 are the same type of material which is self-supporting and consists of refractory particles in an air-space-providing and connected relationship as provided by foam glass and as described in some detail in my previously-mentioned copending application.

The supplementary units 25 and 25′ are filled with a main body of explosive material 29 and, as shown in Figure 3, are provided with a pair of horizontal detonators 20b within their outer end portions (upper end portion of the unit 25 and lower end portion of the unit 25′) that are connected to wiring cable 22 by wiring leads 22b over which the explosive material 29 is placed or poured.

The inner end portion 26b of the upper unit 25 is adapted to fit within the socket portion 11a of the unit 10 and to be secured thereto by a nut and bolt assembly 17 which extends through sleeves 30 in its water-jacketed side walls 26. The lower end portion of the lower supplementaary or booster unit 25′ also has sleeves 30 through its water-jacketed side walls 26 to receive a bolt and nut assembly 17 when it is to be secured to a mouth portion 35′a of a lower tamping unit 35′, see Figure 12.

As shown particularly in Figures 1 and 4, the upper tamping unit 35 is of cylindrical, longitudinally-extending shape and is defined by side walls 36 and a bottom end wall 37. At its upper end, the unit 35 has a pair of reinforcing support members 38 which are secured thereto and which have loop ends for carrying looped-over ends of a bailer 39 to which the cable 5 is secured. A cone-shaped nose 45, see Figures 4 and 16, is shown secured by metal screws 46 over and to the upper end of the unit 35 to streamline it. A conventional timer unit 40 is shown positioned within an upper end chamber of the unit 35, but tamping material receiving space may be saved by, as preferred, positioning the unit 40 within the cone 45. Packing 41a, e.g. glass or fiber wool, is shown positioned about the unit 40. The timer unit 40 consisting of a clock, battery or other electric current producer, has a wiring cable 22 extending therefrom through a hole in its bottom wall 37 and downwardly along the assembly to connect with the branches 22a, 22b, etc., of the various explosive units. The unit 35 is substantially fully filled up with a solid mass (tamping) material 41, such as concrete or cast iron. Depending upon the type of material 41 that is used, it may be formed with a longitudinal hole through it to by-pass the cable 22 or may be poured and set about the cable 22.

If as shown in Figure 2, a bottom tamping unit 35′ is required, it is of the same general construction as the unit 35 of Figure 4, except that the parts 38, 39 and 40 are omitted and it is completely filled up with a mass of material 41, see Figure 12.

Although I have shown the detonators of the main or central unit 10 as connected through wiring to the detonators of the booster units 25 and 25′, the detonators of the main unit will be of a timed-delayed type, so that they will explode the material 18 of the unit 10 at the time the explosive forces of the supplementary units 25 and 25′ have reached the inner ends of such units and are moving through the directionating elements or slugs 28. A simple manner of insuring this result is to provide dynamite caps or shock-sensitive detonators at opposite ends of the unit 10 which will go off when the explosive forces generated by the supplementary units 25 and 25′ reach the unit 10. By way of example, I have shown electric detonators 20a that are timed to operate in the same manner. Vertical detonators 20 are, as an optimum, timed to operate immediately following the detonators 20a.

In the embodiment of Figure 5, I have shown additional horizontal detonators 20b' in the inner end portion of each booster unit 25 and 25' and connected by wiring 22c to the wiring cable 22. These detonators will, as an optimum, have the same speed and be actuated at the same time as the outer detonators 20b. In this manner, opposite ends of the booster charges 29 may be exploded simultaneously.

By way of example, the containers of the units 25 and 25' may be filled with a regular solidified gelatin of nitroglycerin, "Gelamite," having a velocity of about 21,300 to 23,600 feet per second. The unit 10 may be filled with material 18, such as solidified nitroglycerin in the nature of "Gelodyn" having a velocity of 10,000 to 12,000 feet per second. This, of course, is based upon the optimum arrangement utilizing different velocities of explosive materials in the supplementary and main units. In the arrangement of Figures 5 and 12, as previously mentioned, the explosive material in the core tube 13 of the main unit 10 may be the same as that of the supplementary units or in other words, of about the same velocity.

In carrying out my invention, the units are assembled as a string above the well hole, and are then let down and suspended or positioned as shown in the figures during the shooting operation.

By way of example, I shot a dry gas well, utilizing the principles of my invention. At first there was hardly any flow of gas. Within a period of about one-half an hour, there were five shocks of gas, indicating gas release from the permeated stratum, followed by a gas flow of about 400,000 cubic feet. Within about a week, the well was flowing gas at the rate of 15 to $20 \times 10^6$ cubic feet with a back pressure of about 1700 to 2000 pounds. The latter rate of gas flow (considerably higher than that required for a commercial well) has been maintained to date. Although nine shots out of ten damage the lower end of the casing for a distance of about 10 to 14 feet, the casing of the above well which had the relative position shown in Figure 1 of the drawings, was not damaged at all. Further, I had to avoid shooting salt which was located below the productive stratum. Although the string rested on such salt as a bridge, the latter was not disturbed in any respect. It should also be noted at this point that primer cord 21 wrapped around the core 13 of the unit 10 also aids in the directionating effect, since it has a speed of about 2,250 feet per second.

In Figures 16 to 20, inclusive, I have shown sets of fins 47 (of at least three fins each, see Figure 17, and in a circumferentially spaced-apart relationship about the container units) that are shown longitudinally spaced along the string or assembly to provide a set for opposite ends of each container unit. It will be noted that one set of fins is provided for adjacent ends of connected container units. These fins 47, the cone-shaped upper end 45, and the rounded bottom end 27' all provide the string or assembly with a stream-line flow construction that is particularly suitable for gas wells having a considerable pressure flow. The fins 47 also flexibly retain the string in alignment within the well hole and prevent it from being swirled or spun while it is being lowered into the well hole. These features are highly important, particularly due to the fact that high explosive is being carried by the string.

As shown, each fin 47 consists of a tadpole part 49 of a thin piece of metal, such as of tin or aluminum, that is folded over at its upper edge 49a (see Figures 18 and 20) and is secured by solder or brazing metal S at its bottom edges 49b to a flexible (spring) wire, slide finger 48. As shown in Figure 18, both the finger 48 and the tadpole-shaped part 49 are brazed or soldered to the outer side wall of the container unit involved, such as the wall of the unit 25. The finger 48 is curved or bent upwardly to provide a guide portion that slides along the inside of the well hole 1 and has a flexible "give" with respect to irregularities therealong. The fins 47 tend to slice through any fluid medium in the well hole 1 and materially reduce resistance offered by the fluid to a lowering of the explosive string.

In Figure 21 I have shown a modified type of assembly employing a central unit 10' that is filled with an air-space providing material 16. Each explosive unit 25 and 25' is shown provided with inner end detonators 20c and will, of course, have outer end detonators 20b as shown in the assembly of Figure 3. An assembly of this type works on the general principle of that of Figure 3, but its force effect is not augmented by explosive force generated by the central unit. In the string of Figure 21, the force action of the auxiliary units 25 and 25' is combined and directed radially-outwardly in a bursting action (as augmented by the effect of air space of the material 16) of a type that is suitable for bursting-out a collar of a sectioned pipe, such as used for water flooding a well to increase its effective productive flow. Pipe of this type may be of about one inch in diameter and great expense and difficulty have before been encountered in attempting to sever and remove its length from a cemented-in lower section, preparatory to sealing off an exhausted well. In employing this assembly, I maintain upward tension on the pipe length while its lower joint is shot and then lift it out of the well.

In my invention, it will thus be apparent that I employ a pair of endwise-positioned explosive units 25 and 25', each of which is provided with means for concentrating explosive forces generated by their charges and directing them in an opposed relationship towards a central or mid area as provided by a central unit. The concentrating and directing of the explosive forces is accomplished by tamping means and by air-space defining means which also functions to expand the forces into the central area. At the central area, the forces are combined and concentrated and changed in direction to move uniformly laterally or annularly outwardly upon an enclosing face of the material or agency to be shot. The effectiveness of the combined forces is increased by providing an air-space defining agency or portions about the central unit.

When the central unit is, itself, provided with explosive material, the forces generated by such material augment the first-mentioned forces and are directed outwardly in the same manner with a combined effect such that the central unit acts substantially as a force accumulator. On the other hand, when the central unit is filled with an air-space defining material, the explosive forces of the supplementary or end units are greatly expanded and increased in effectiveness to burst out as combined forces into the face to be shot.

What I claim is:

1. In an improved well shooting assembly of the character shown and described, the combination of a vertically-extending central explosive unit to be positioned in vertical alignment with a potentially productive stratum, a pair of vertically-extending booster explosive units in an endwise-opposed relationship with respect to each other in close operating alignment with said central unit; separate detonating means for each of the booster units and said central unit including a first detonating means for said central unit and additional detonating means energizing said booster units substantially simultaneously and, in a timed relation thereafter, energizing said first detonating means; tamping means spaced about said booster units to concentrate and direct and fully confine explosive forces generated by them vertically toward said central unit within the vertical confines of said units, air-space defining means of minimized density interposed between said central unit and inner end portions of said booster units to expand and increase the effectiveness of explosive forces generated by said booster units upon said central unit, a vertically-extending directionating core along said central unit, and means about said central unit for directing explosive forces generated by said central unit and received by said booster units laterally-outwardly from said central unit.

2. An assembly as defined in claim 1 wherein said explosive forces directing means is an air-space directionating chamber about said central unit and between said directionating core and the stratum to be shot for increasing the effectiveness of explosive forces upon such stratum.

3. An assembly as defined in claim 1 wherein, said directionating core is defined by solid tamping material.

4. An assembly as defined in claim 1 wherein, said directionating core contains explosive material of greater speed than explosive material of said central unit.

5. In an improved well shooting assembly of the character shown and described, the combination of a vertically-extending central directional unit containing an explosive material and to be aligned substantially vertically with an enclosing face to be shot, said central unit having portions defining an air-space of minimized density about its interior, a pair of supplemental units containing explosive material and positioned adjacent to and in vertical endwise alignment with said central unit and in an opposed relationship with respect to each other, tamping means circumscribed by vertical side wall portions of each of said supplemental units, additional tamping means connected to outer end portions of each of said supplemental units to direct and fully confine explosive forces generated by said units endwise upon said central unit within vertical confines of said unit, at least one air-space-provided directionating slug at inner end portions of each of said supplemental units and adjacent opposed ends of said central unit to supplement said tamping means in directing explosive forces generating by said supplemental units endwise upon said central unit, energizing means for exploding the material of said central unit, additional energizing means for exploding the explosive material of said supplemental units substantially simultaneously in timed relation prior to the explosion of the explosive material in said central unit to provide an explosive force adjacent the face to be shot which is substantially equal to the additive disrupting forces of all three explosive materials, and means for securing said units in the defined assembled operative relationship with each other.

6. An improved shooting assembly as defined in claim 5 wherein said air-space of minimized density is filled with a mass of frangible material.

7. In an improved well shooting assembly of the character shown and described, the combination of a central explosive unit having a vertically-extending housing therealong containing an explosive material, a self-supporting porous-refractory-foam-glass body of minimized density about said housing and extending vertically therealong to direct explosive forces laterally-outwardly from said central unit, a directionating core extending vertically-axially along said central unit and within said housing, said core having a relatively faster type of explosive material therein to cooperate with said foam-glass body in directing explosive forces laterally-outwardly from said central unit, a pair of vertically-extending booster explosive units positioned in endwise abutment with said central unit at opposite ends thereof, each of said booster units having a housing extending vertically therealong to receive explosive material therein, a tamping jacket about and vertically along the housing of each of said booster units to direct and confine explosive forces generated thereby vertically-axially of each of said units, tamping means in operative engagement with the outer end portion of each of said booster units to direct and confine and cooperate with said tamping jacket in directing and confining explosive forces generated thereby vertically-axially into said central unit within vertical confines of said units, and a directionating slug having a self-supporting refractory foam glass body of minimized density interposed between the explosive material of said central unit and the explosive material of each of said booster units to direct and expand the explosive forces generated by said booster units upon said central unit, and means to detonate said booster units simultaneously with respect to each other and to detonate said central unit after said booster units, said central unit receiving the explosive forces generated by all of said units and continuously flowing said forces laterally-outwardly therefrom in a substantially uniform force action.

References Cited in the file of this patent

UNITED STATES PATENTS

| | | | |
|---|---|---|---|
| Re. 3,375 | Shaffner | Apr. 13, | 1869 |
| Re. 21,356 | Pitzer | Feb. 13, | 1940 |
| 82,586 | Beach | Sept. 29, | 1868 |
| 87,372 | Shaffner | Mar. 2, | 1869 |
| 94,813 | Dickey | Sept. 14, | 1869 |
| 156,673 | Peck | Nov. 10, | 1874 |
| 203,034 | Hans | Apr. 30, | 1878 |
| 1,406,844 | Gelm | Feb. 14, | 1922 |
| 2,031,505 | Rison | Feb. 18, | 1936 |
| 2,163,462 | Holran et al. | June 20, | 1939 |
| 2,251,712 | Mays | Aug. 5, | 1941 |
| 2,362,829 | Kinley | Nov. 14, | 1944 |
| 2,363,234 | Doll | Nov. 21, | 1944 |
| 2,455,556 | Burch | Dec. 7, | 1948 |
| 2,558,924 | Blake | July 3, | 1951 |
| 2,671,400 | Duesing | Mar. 9, | 1954 |

UNITED STATES PATENT OFFICE

CERTIFICATE OF CORRECTION

Patent No. 2,921,519                              January 19, 1960

Thomas B. Martin

It is hereby certified that error appears in the printed specification of the above numbered patent requiring correction and that the said Letters Patent should read as corrected below.

Column 3, line 6, for "appled" read -- applied --; line 75, after "which" insert -- is employed with an upper booster or supplementary --; column 8, lines 24 and 25, for "supplementaary" read -- supplementary --.

Signed and sealed this 21st day of June 1960.

(SEAL)
Attest:

KARL H. AXLINE                                ROBERT C. WATSON

Attesting Officer                              Commissioner of Patents